US012426139B1

(12) United States Patent
Greening

(10) Patent No.: US 12,426,139 B1
(45) Date of Patent: Sep. 23, 2025

(54) FEEDBACK CONTROL OF A DIODE ELEMENT

(71) Applicant: Apple Inc., Cupertino, CA (US)

(72) Inventor: Thomas C. Greening, San Jose, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 18/103,186

(22) Filed: Jan. 30, 2023

Related U.S. Application Data

(60) Provisional application No. 63/355,897, filed on Jun. 27, 2022.

(51) Int. Cl.
*H05B 45/325* (2020.01)

(52) U.S. Cl.
CPC .................................. *H05B 45/325* (2020.01)

(58) Field of Classification Search
CPC .................................................... H05B 45/325
See application file for complete search history.

(56) References Cited

U.S. PATENT DOCUMENTS 4,227,091 A 10/1980 Sick
4,318,058 A 3/1982 Mito
4,880,304 A 11/1989 Jaeb
4,896,325 A 1/1990 Coldren
5,140,605 A 8/1992 Paoli
5,159,700 A 10/1992 Reid
5,287,376 A 2/1994 Paoli
5,319,725 A 6/1994 Buchmann et al.
5,325,392 A 6/1994 Tohmori
5,341,391 A 8/1994 Ishimura
5,384,797 A 1/1995 Welch
5,483,261 A 1/1996 Yasutake
5,488,204 A 1/1996 Mead et al.
(Continued)

FOREIGN PATENT DOCUMENTS

CN 1173226 2/1998
CN 1173226 A * 2/1998 ............ B32B 27/10
(Continued)

OTHER PUBLICATIONS

U.S. Appl. No. 17/850,828, filed Jun. 27, 2022, Witmer et al.
(Continued)

*Primary Examiner* — Lincoln D Donovan
*Assistant Examiner* — James G Yeaman
(74) *Attorney, Agent, or Firm* — Brownstein Hyatt Farber Schreck, LLP

(57) ABSTRACT

Configurations for a light source unit and driver circuit and methods thereof are disclosed. The light source unit may include the driver circuit, a power source, a light source, an optical splitter, and a controller. The driver circuit may include an anti-logarithmic pulse width modulated circuit that provides a signal to a switching converter. In some embodiments, the anti-logarithmic pulse width modulated circuit includes a digital-to-analog converter, among other components. The switching converter supplies a drive current to the light source. Because the anti-logarithmic pulse width modulated circuit generates a voltage with a duty cycle that logarithmically varies as the input signal changes, the switching converter may directly drive the light source.

16 Claims, 5 Drawing Sheets

(56) References Cited

U.S. PATENT DOCUMENTS 5,515,391 A 5/1996 Endriz
5,574,561 A 11/1996 Boudreau
5,695,520 A 12/1997 Bruckner et al.
5,708,674 A 1/1998 Berrnink
5,742,631 A 4/1998 Paoli
5,780,875 A 7/1998 Tsuji
5,825,352 A 10/1998 Bisset et al.
5,835,079 A 11/1998 Shieh
5,850,411 A 12/1998 Major, Jr.
5,880,411 A 3/1999 Gillespie et al.
5,898,806 A 4/1999 Nishimoto
5,915,165 A 6/1999 Sun
6,043,104 A 3/2000 Uchida
6,160,936 A 12/2000 You et al.
6,188,391 B1 2/2001 Seely et al.
6,250,819 B1 6/2001 Porte
6,263,222 B1 7/2001 Diab
6,310,610 B1 10/2001 Beaton et al.
6,341,116 B1 1/2002 Lee
6,345,135 B1 2/2002 Reid
6,373,872 B2 4/2002 Deacon
6,393,185 B1 5/2002 Deacon et al.
6,475,153 B1 11/2002 Khair et al.
6,516,017 B1 2/2003 Matsumoto
6,558,335 B1 5/2003 Thede
6,605,045 B2 8/2003 Ohsaki et al.
6,628,686 B1 9/2003 Sargent
6,643,434 B2 11/2003 Cayrefourcq et al.
6,647,032 B1 11/2003 Lee et al.
6,661,955 B1 12/2003 Calvet
6,690,387 B2 2/2004 Zimmerman et al.
6,690,693 B1 2/2004 Crowder
6,699,199 B2 3/2004 Asada et al.
6,788,719 B2 9/2004 Crowder
6,795,453 B2 9/2004 Pezeskhi et al.
6,803,604 B2 10/2004 Takahashi et al.
6,807,206 B2 10/2004 Tuskiji et al.
6,816,529 B2 11/2004 Vail
6,829,400 B2 * 12/2004 Nakano ................ G02B 6/3588
385/16
6,911,629 B2 6/2005 Lano et al.
6,915,955 B2 7/2005 Jung
6,987,906 B2 1/2006 Nakama et al.
6,990,129 B2 1/2006 Buimovich et al.
7,015,894 B2 3/2006 Morohoshi
7,106,778 B2 9/2006 Reid
7,130,325 B2 10/2006 Oh et al.
7,184,064 B2 2/2007 Zimmerman et al.
7,189,011 B2 3/2007 Harker
7,196,355 B2 3/2007 De La Grandiere et al.
7,283,242 B2 10/2007 Thornton
7,394,734 B2 * 7/2008 Ishimoto .............. G11B 7/1387
369/53.28
7,468,637 B2 12/2008 Braun et al.
7,469,092 B2 12/2008 Sappey et al.
7,480,317 B2 1/2009 Hu et al.
7,483,453 B2 1/2009 Diffily et al.
7,526,007 B2 4/2009 Chua et al.
7,558,301 B2 7/2009 Lin et al.
7,616,110 B2 11/2009 Crump et al.
7,620,078 B2 11/2009 Mori
7,663,607 B2 2/2010 Hotelling et al.
7,664,156 B2 2/2010 Yamazaki
7,701,985 B2 4/2010 Webster et al.
7,738,935 B1 6/2010 Turcott
7,751,658 B2 7/2010 Welch et al.
7,852,898 B2 12/2010 Yokoyama et al.
7,885,302 B2 2/2011 Eberhard
7,903,704 B2 3/2011 Patel et al.
8,000,368 B2 8/2011 Pezeshki
8,121,169 B2 2/2012 Nguyen et al.
8,222,084 B2 7/2012 Dallesasse et al.
8,259,770 B2 9/2012 Tagansky
8,279,441 B2 10/2012 Brown
8,320,763 B2 11/2012 Kim et al.
8,352,008 B2 1/2013 Kuhn et al.
8,378,811 B2 2/2013 Crump et al.
8,405,699 B2 3/2013 Niwa et al.
8,437,825 B2 5/2013 Dalvi et al.
8,442,608 B2 5/2013 Pav
8,457,172 B2 6/2013 Reid et al.
8,588,266 B2 11/2013 Fujii
8,618,930 B2 12/2013 Papadopoulos et al.
8,649,839 B2 2/2014 Chin
8,750,341 B2 6/2014 Bazzani
8,774,243 B2 7/2014 Kim et al.
8,781,548 B2 7/2014 Besko et al.
8,805,129 B2 8/2014 Han et al.
8,886,465 B2 11/2014 Cinbis et al.
8,954,135 B2 2/2015 Yuen et al.
8,964,806 B2 2/2015 Ensher et al.
8,995,483 B2 3/2015 Diehl et al.
9,065,251 B2 6/2015 Fukuda et al.
9,093,813 B2 7/2015 Pushkarsky et al.
9,172,211 B2 10/2015 Kuksenkov et al.
9,209,602 B2 12/2015 Davies et al.
9,323,012 B1 4/2016 Sun et al.
9,425,365 B2 8/2016 Kurtin
9,526,421 B2 12/2016 Papadopoulos et al.
9,526,431 B2 12/2016 Zakharov et al.
9,529,160 B2 12/2016 Orcutt et al.
9,543,736 B1 1/2017 Barwicz et al.
9,577,410 B2 2/2017 Yamazaki
9,595,804 B2 3/2017 Minneman et al.
9,755,399 B2 9/2017 Tulip
9,759,652 B2 9/2017 Yu
9,780,266 B2 10/2017 Lotito et al.
9,804,027 B2 10/2017 Fish
9,829,631 B2 11/2017 Lambert
9,882,073 B2 1/2018 Krasulick et al.
9,883,824 B2 2/2018 Tiao
9,888,838 B2 2/2018 Ito et al.
9,935,426 B2 4/2018 Kaneko
9,948,063 B2 4/2018 Caneau et al.
10,004,408 B2 6/2018 Naima
10,060,788 B2 8/2018 Fei
10,078,183 B2 9/2018 Adderly et al.
10,082,625 B2 9/2018 Budd
10,098,555 B2 10/2018 Yamaji
10,168,497 B2 1/2019 Merget
10,181,696 B2 1/2019 Evans et al.
10,215,698 B2 2/2019 Han et al.
10,319,693 B2 6/2019 Lambert
10,319,878 B2 6/2019 Ulmer et al.
10,413,362 B2 9/2019 Griffin
10,433,739 B2 10/2019 Weekly et al.
10,535,979 B2 1/2020 Audet et al.
10,678,005 B2 6/2020 Kinghorn
10,687,718 B2 6/2020 Allec et al.
10,697,830 B1 6/2020 Kangas et al.
10,710,495 B2 * 7/2020 Ichikawa ............... H05B 45/48
10,788,368 B1 9/2020 Pelc et al.
10,852,492 B1 12/2020 Vermeulen et al.
10,868,407 B2 12/2020 Mathai et al.
10,895,568 B2 1/2021 Barwicz et al.
10,973,446 B2 4/2021 Schie
11,036,015 B2 6/2021 Shikama et al.
11,158,996 B2 10/2021 Bismuto et al.
11,171,464 B1 11/2021 Bishop et al.
11,181,702 B2 11/2021 Chen et al.
11,385,409 B2 7/2022 Ishikawa
11,409,059 B1 8/2022 Vermeulen
11,437,779 B2 9/2022 Audet et al.
11,469,570 B2 10/2022 Audet et al.
11,493,705 B2 11/2022 Shikama
11,552,454 B1 1/2023 Arbore et al.
11,644,618 B2 5/2023 Bishop et al.
11,686,906 B1 6/2023 Venkatesan
2001/0055447 A1 12/2001 Delprat et al.
2002/0181521 A1 12/2002 Crowder et al.
2004/0126117 A1 7/2004 Lo et al.
2004/0174915 A1 9/2004 Sarlet et al.
2004/0255318 A1 12/2004 Braetberg et al.
2005/0127383 A1 6/2005 Kikawa et al.

(56) References Cited

U.S. PATENT DOCUMENTS

| | | | |
|---|---|---|---|
| 2005/0169327 | A1 | 8/2005 | Eden et al. |
| 2006/0088068 | A1 | 4/2006 | Farrell et al. |
| 2007/0116076 | A1 | 5/2007 | Wang et al. |
| 2007/0223549 | A1 | 9/2007 | Livshits et al. |
| 2008/0063016 | A1 | 3/2008 | Bhatia et al. |
| 2008/0310470 | A1 | 12/2008 | Ooi et al. |
| 2010/0046562 | A1 | 2/2010 | Donegan et al. |
| 2013/0292571 | A1 | 11/2013 | Mukherjee et al. |
| 2016/0296173 | A1 | 10/2016 | Culbert |
| 2017/0033531 | A1 | 2/2017 | Treese et al. |
| 2017/0045450 | A1 | 2/2017 | Lieber et al. |
| 2017/0249445 | A1 | 8/2017 | Devries et al. |
| 2017/0325744 | A1 | 11/2017 | Allec et al. |
| 2018/0054038 | A1 | 2/2018 | Kim |
| 2018/0083421 | A1 | 3/2018 | Audet et al. |
| 2020/0227895 | A1 | 7/2020 | Takigawa et al. |
| 2022/0006267 | A1 | 1/2022 | Bismuto et al. |
| 2022/0046774 | A1* | 2/2022 | Kersey ................. H05B 45/325 |
| 2022/0061135 | A1* | 2/2022 | Gu ......................... H05B 45/14 |
| 2022/0131340 | A1 | 4/2022 | Bishop et al. |
| 2023/0076055 | A1 | 3/2023 | Vallance et al. |
| 2023/0102867 | A1 | 3/2023 | Witmer et al. |
| 2023/0163573 | A1 | 5/2023 | Arbore et al. |
| 2024/0113508 | A1 | 4/2024 | Bismuto et al. |
| 2024/0280767 | A1 | 8/2024 | Witmer et al. |
| 2024/0291230 | A1 | 8/2024 | Bishop et al. |

FOREIGN PATENT DOCUMENTS

| | | | |
|---|---|---|---|
| CN | 1416533 | A | 5/2003 |
| CN | 1488183 | A | 4/2004 |
| CN | 1703783 | A | 11/2005 |
| CN | 102522697 | | 6/2012 |
| CN | 104393482 | | 3/2015 |
| CN | 205680923 | U | 11/2016 |
| CN | 114303038 | A | 4/2022 |
| DE | 102008014093 | A1 | 7/2009 |
| DE | 102010020625 | A1 | 11/2011 |
| EP | 0203810 | A2 | 12/1986 |
| EP | 1753104 | | 2/2007 |
| EP | 2091118 | | 8/2009 |
| EP | 2120301 | | 11/2009 |
| EP | 2849294 | | 3/2015 |
| EP | 2992821 | | 3/2016 |
| GB | 2380058 | | 3/2003 |
| JP | 04116878 | | 4/1992 |
| JP | 2000163031 | | 6/2000 |
| JP | 2002342033 | | 11/2002 |
| JP | 2005175021 | | 6/2005 |
| JP | 2008262116 | | 10/2008 |
| JP | 2010503987 | | 2/2010 |
| JP | 2015115411 | | 6/2015 |
| WO | WO 96/011416 | | 4/1996 |
| WO | WO 05/091036 | | 9/2005 |
| WO | WO 08/033251 | | 3/2008 |
| WO | WO 16/144831 | | 9/2016 |
| WO | WO 16/176364 | | 11/2016 |
| WO | WO 17/197033 | | 11/2017 |

OTHER PUBLICATIONS

U.S. Appl. No. 18/094,797, filed Jan. 9, 2023, Arbore et al.

He et al., "Integrated Polarization Compensator for WDM Waveguide Demultiplexers," *IEEE Photonics Technology Letters* vol. 11, No. 2, Feb. 1999, pp. 224-226.

Tohmori, et al., "Broad-Range Wavelength-Tunable Superstructure Grating (SSG) DBR Lasers," IEEE Journal of Quantum Electronics, vol. 29, No. 6, Jun. 1993, pp. 1817-1823.

* cited by examiner

FEEDBACK CONTROL OF A DIODE ELEMENT

CROSS-REFERENCE TO RELATED APPLICATION

This application is a nonprovisional and claims the benefit under 35 U.S.C. § 119 (e) of U.S. Provisional Patent Application No. 63/355,897, filed Jun. 27, 2022, the contents of which are incorporated herein by reference as if fully disclosed herein.

FIELD

This disclosure relates generally to systems, devices, and methods utilizing feedback control of a diode element such as a light source. More particularly, this disclosure relates to the use of a switching converter to drive a light source.

BACKGROUND

Light sources such as lasers and light emitting diodes are typically driven to generate light using voltage or current received from a driver. In some instances a driver may be controlled using an open-loop approach in which the driver provides a precise current or voltage to a light source to control wavelength and intensity. Open-loop drivers rely on a steady state behavior of a light source to achieve a stable intensity and wavelength, and as a result these parameters may fluctuate when the light source isn't at steady state. Closed-loop control in a system may allow a driver to control the wavelength of a light source even when it hasn't reached steady state allowing the intensity to vary, but often does so at the cost of power efficiency. In both open- and closed-loop control of a light source, deviations in the output of the driver may result in unwanted fluctuations in the intensity and/or wavelength of a light source. Accordingly, it may be desirable to provide accurate and efficient drivers for driving light sources.

SUMMARY

Embodiments of the systems, devices, methods, and apparatuses described in the present disclosure are directed to providing feedback-based control of a diode element. Some embodiments include a light source unit, and a control system may provide open-loop or closed-loop control of a light source. Also described are systems, devices, methods, and apparatuses directed to a driver unit for driving a light source using closed-loop control. The driver unit may be part of the light source unit and may include a driver circuit and a controller. The driver circuit may include a direct current to direct current ("DC/DC") switching converter and an anti-logarithmic pulse width modulated ("anti-log PWM") circuit. The light source unit may include the driver unit as well as a power supply, a light source (e.g., laser), and an optical splitter. The driver unit may generate a pulse width modulated signal with a duty cycle that logarithmically varies with changes in a digital-to-analog converter voltage. This allows the switching converter to directly drive the light source. Put another way, the switching converter is a controllable element that may be based on a feedback signal to provide a target output current or voltage to the light source.

In some examples, the present disclosure describes a light source unit. The light source unit may include a light source configured to emit a first light and an optical splitter configured to split the emitted first light into a first portion of light and a second portion of light. The light source unit may also include a controller configured to receive the second portion of light and configured to generate a feedback signal using the received second portion of light. Additionally, the light source unit may include a driver circuit, comprising a switching converter, where the driver circuit is configured to receive the feedback signal, generate a first voltage with a duty cycle that varies logarithmically with a voltage change of the feedback signal, and supply a current based on the first voltage to the light source.

The driver circuit may include an anti-logarithmic pulse width modulated circuit configured to generate a waveform having an anti-logarithmic shape and compare the waveform having the anti-logarithmic shape to the feedback signal to generate the first voltage. The switching converter may receive the first voltage to control a voltage output of the switching converter. In some instances, the controller includes a measurement unit operable to receive the second portion of light and generate a wavelength measurement signal indicative of a wavelength of light of the second portion of light. In some of these variations, the measurement unit is configured to be operable to output an intensity measurement signal indicative of intensity of the second portion of light. Additionally or alternatively, the controller further comprises a servo controller operable to receive the wavelength measurement signal from the measurement unit and generate the feedback signal.

In some variations, the driver circuit includes an anti-logarithmic pulse width modulated circuit operable to receive the feedback signal from the servo controller. The anti-logarithmic pulse width modulated circuit can include a triangle wave generator operable to output a triangle waveform signal, an inverter operable to receive the triangle waveform signal and invert the triangle waveform signal, an anti-logarithmic amplifier operable to receive the inverted triangle waveform signal and generate a waveform having an anti-logarithmic shape, a digital-to-analog converter, and a comparator. The digital-to-analog converter converts the feedback signal to an analog feedback signal, and the comparator receives the waveform as a first input and the analog feedback signal as a second input.

In some examples, the present disclosure describes a driver circuit. The driver circuit may include an anti-logarithmic pulse width modulated circuit comprising a digital-to-analog converter, where the anti-logarithmic pulse width modulated circuit is configured to generate a pulse width modulated voltage having a duty cycle that varies logarithmically with a voltage change of an input signal. The light source driver circuit may further include a switching converter configured to receive the pulse width modulated voltage and supply a current to a diode element based on the pulse width modulated voltage.

In some examples, the present disclosure describes a method of driving a light source. The method may include measuring, at a controller, an operating parameter of the light source, generating a feedback signal using the measured operating parameter, transmitting the feedback signal to a driver circuit, generating a first voltage with a duty cycle that varies logarithmically with the feedback signal, and supplying a current based on the first voltage, via a switching converter, to the light source. In some instances, the operating parameter is a wavelength or intensity of a portion of light emitted by the light source, and measuring the operating parameter includes measuring the wavelength or intensity using a measurement unit.

The anti-logarithmic pulse width modulated circuit may include a triangle wave generator operable to output a triangle waveform signal. An inverter may receive the triangle waveform signal and invert the triangle waveform signal, while an anti-logarithmic amplifier receives the triangle waveform inverted signal and generates a waveform having an anti-logarithmic shape. A comparator receives the waveform as a first input and the input signal as a second input. In some instances, the diode element is a laser that receives a drive current from the switching converter. In these instances, the anti-logarithmic pulse width modulated circuit is configured to generate a linear relationship between the input signal and the drive current. In some instances, the input signal is an output of the digital-to-analog converter.

In some instances, generating the first voltage with the duty cycle that varies logarithmically includes generating a waveform having an anti-logarithmic shape using an anti-logarithmic pulse width modulated circuit. Generating the first voltage may comprise comparing the waveform to the feedback signal, and in some instances may include converting the feedback signal to an analog feedback signal using a digital-to-analog converter. Comparing the waveform to the feedback signal may include comparing the waveform to the analog feedback signal. In some instances, the waveform is generated from a triangle waveform using an anti-logarithmic amplifier.

In addition to the example aspects and embodiments described above, further aspects and embodiments will become apparent by reference to the drawings and by study of the following description.

Figure 1:
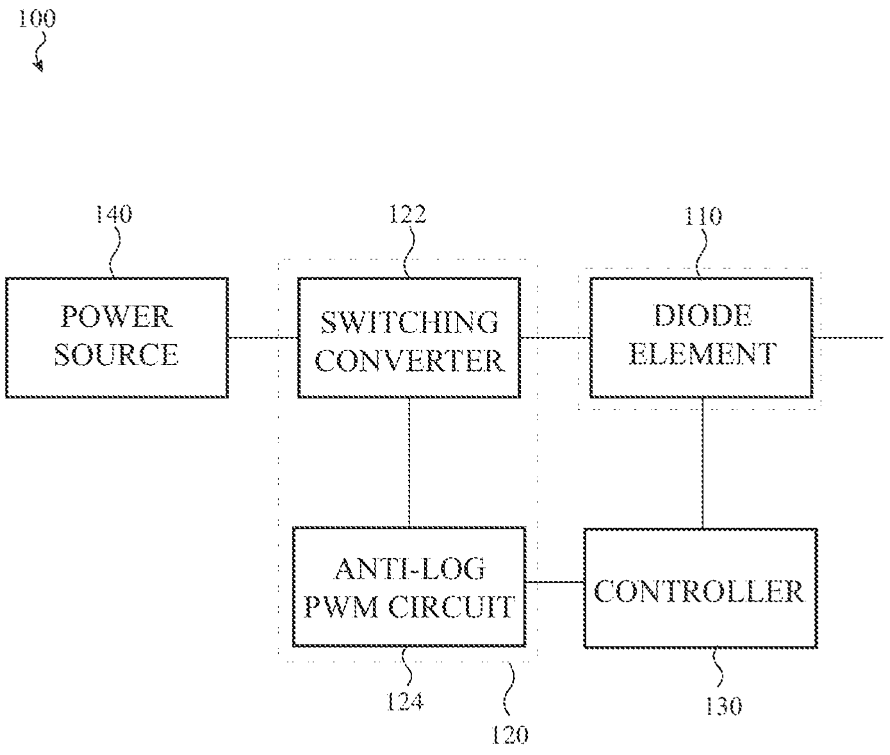
FIG. 1 illustrates an example block diagram of a control system for operating a diode element.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described here are driver circuits and associated control systems for operating a diode element. Specifically, the driver circuits include a switching converter that is operated using a duty cycle that varies logarithmically with an input signal received by the driver circuit. The switching converter provides a variable amount of current to the diode element by adjusting the duty cycle of the switching converter. An operating parameter of the diode element (e.g., a current received by the diode element, a voltage across the diode element, or an output of the diode element) may be measured to create the input signal. In this way, the input signal acts as a feedback signal to control the operating parameter of the diode element to a target a value.

In some instances, the control system is part of a light source unit. In these instances, the diode element is a light source with a diode response, such as a laser diode or a light emitting diode. A driver circuit including a switching converter that drives the light source, and the switching converter is controlled using a duty cycle that varies logarithmically with an input signal received by the driver circuit. In some instances, the control system is an open-loop control system, and the input signal is a feedback signal generated using an input to the light source (e.g., the current provided by the switching converter to the light source). In other instances, the control system is a closed-loop control system, and the input signal is a feedback signal generated using an output of the light source (e.g., by measuring a wavelength or intensity of light generated by the light source).

These and other embodiments are discussed below with reference to FIGS. 1-5. However, those skilled in the art will readily appreciate that the detailed description given herein with respect to these figures is for explanatory purposes only and should not be construed as limiting.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIG. 1 shows an example block diagram of a control system 100 as described herein. As shown there, the control system 100 includes a diode element 110, a driver circuit 120, a controller 130, and a power source 140. The driver circuit 120 drives the diode element 110 and utilizes feedback from the controller 130 to operate the diode element 110 with a target operating parameter. The control system 100 is configured such that there is a non-linear relationship between a feedback signal from the controller 130 and a duty cycle used to drive the diode element 110.

The diode element 110 may be any component that has a diode response (i.e., a non-linear current-voltage relationship). For example, the diode element may be a light source such as a laser diode or light emitting diode, a diode phase shifter such as a PIN diode phase shifter, or the like. Because diodes have a non-linear current-voltage relationship, it may be difficult to provide precise control of the current supplied that is needed to operate the diode element. Accordingly, by providing a feedback signal that also has a non-linear relationship between a feedback signal and a duty cycle used to control the switching converter 122, the control system increases the linearity of the relationship between the feedback signal and the current generated by the driver circuit 120 to drive the diode element 110.

Specifically, the driver circuit 120 may include a switching converter 122, which may be a DC/DC switching converter such as a buck converter, boost converter, buck-boost converter, a Ćuk converter, a Zeta converter, a SEPIC converter, or the like. The power source 140 is connected to the driver circuit 120 to provide an input voltage to the switching converter 122. The switching converter 122 generates an output voltage that powers the diode element 110.

The switching converter 122 is controlled using a voltage having a duty cycle, where changes in the duty cycle change the output of the switching converter 122. A feedback signal is generated by the controller 130, and is used to control the duty cycle of the switching converter 122. To generate the feedback signal, the controller 130 measures one or more operating parameters of the diode element (e.g., a current received by the diode element, a voltage across the diode element, or an output of the diode element), and generates a feedback signal based on a difference between the measured operating parameter and a target operating parameter.

To create a non-linear relationship between this feedback signal and the duty cycle that controls the switching converter, the control system includes an anti-logarithmic pulse width modulated ("anti-log PWM") circuit 124 which generates a pulse-width modulated signal ("PWM signal") having a duty cycle that varies non-linearly as a function of an input signal to the anti-log PWM circuit. The anti-log PWM circuit 124, which will be described in more detail below, receives the feedback signal from the controller 130 as the input signal, and outputs the PWM signal to the switching converter 122 to control the switching converter 122. In this way, the control system 100 may increase the linearity between the feedback signal generated by the controller 130 and the current output of the switching converter 122.

Specific examples of the control system 100 will be discussed below with respect to light source units having a light source such as a laser diode, though it should be appreciated that these teachings may be applied to any suitable diode element, such as those described above. Specifically, a driver circuit 120 and a controller 130 as discussed above may be used in a light source unit to provide open-loop or closed-loop control of a light source.

In order for a light source to emit light in either of these systems, a driver of the driver circuit drives the laser with a particular target voltage or current depending on the configuration of the driver. In some driver circuits that utilize open-loop control, the driver circuits provide a constant drive current to obtain a desired output from the laser. Since the driver circuit provides a constant drive current regardless of the actual output of the light source, controlling the intensity and wavelength to predetermined target values depends on a steady state condition of the laser. Accordingly, a laser in these open-loop systems emits light with the characteristics after reaching a steady-state condition.

Deviations from steady state, however, may adversely impact the control of intensity and/or wavelength in open-loop driver circuits. For example, variable ambient conditions may cause fluctuations in the temperature of the laser, resulting in corresponding fluctuations to the wavelength of the laser. Additionally, when a laser is first activated, it takes a period of time before the laser can reach this steady state condition. Accordingly, open-loop control of these lasers has a minimum time before the laser can reliably generate a controlled wavelength, and thus these open-loop driver circuits have limited applicability in optical systems where a light source with a precise wavelength is used to generate short pulses.

While the control of the light source is considered open-loop in that the target current or wavelength is independent of the output light source, a light source unit with open control may still utilize feedback. Specifically, there may be fluctuations in the system (e.g., in the power source or from external noise sources) that cause a current or voltage supplied by the driver circuit to vary from a target value. As a result, in may be desirable to use feedback from the control system 100 of FIG. 1 to facilitate open-loop control of a light source. In these instances, the diode element 110 is a light source, and the controller 130 receives a target operating parameter for the light source. The controller 130 measures a current operating parameter of the light source, such as a voltage across the light source or a current supplied to the light source, and compares the measured operating parameter to a target value for that operating parameter.

The controller 130 generates a feedback signal based on a difference between the measured operating parameter and the target value. The feedback signal is then provided to the driver circuit 120, where it is used to set the duty cycle of the signal that controls the switching converter 122. Accordingly, the feedback signal adjusts operation of the switching converter 122 to maintain the measured operating parameter to its target value. The non-linear relationship between the feedback signal controller and the duty cycle of the signal controlling the switching converter 122 helps to improve the linearity between the feedback signal and the current outputted by the switching converter, which may allow for more precise control of the operating parameters of the light source.

In other instances, to provide fast and reliable wavelength control of a laser, a light source unit may include a closed-loop driver circuit. In these instances, the closed-loop driver circuit may use a feedback signal generated from the light emitted by the laser to control the wavelength of the laser. By utilizing feedback, the driver circuit may quickly drive the wavelength toward a target wavelength and adjust for fluctuations in ambient conditions. Many closed-loop drivers rely on linear current sources that need to be designed for worst-case loads, and thus are very power inefficient.

Figure 2A:
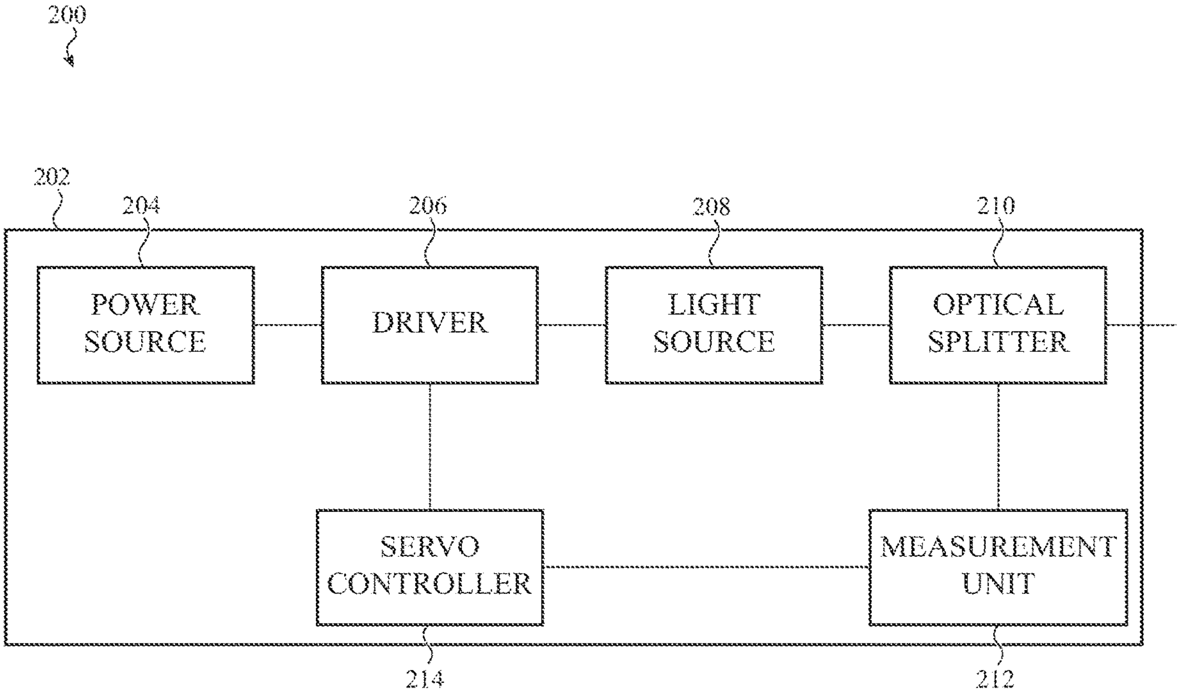
FIG. 2A illustrates an example block diagram of a light source unit.

FIG. 2A shows one such example block diagram 200 of one such light source unit 202 that utilizes closed-loop control. The light source unit 200 includes a power source 204, a driver 206, a light source 208, an optical splitter 210, a measurement unit 212, and a servo controller 214. Specifically, the measurement unit 212 and the servo controller 214 monitor light generated by the light source 208 (i.e., by receiving a portion of that light via optical splitter 210) and provide a feedback signal to the driver 206 to change the target voltage or current output of the driver 206. This in turn adjusts the drive current of the light source 208, thereby providing closed-loop control of the light source 208. Specifically, as the light source 208 generates light during a first time period, the measurement unit 212 can determine differences between the wavelength of the generated light and a target wavelength. The servo controller 214 controls the output of the driver 206 (which in FIG. 2A is a linear current driver), and uses the feedback from the measurement unit 212 to adjust the output until the target wavelength is reached. As mentioned above, the driver 206 is designed to accommodate peak loads of the light source 208 (such as when a light source 208 is first driven to generate light), which can result in a significant loss of efficiency at lower loads that may be more common during light generation.

Conversely, the closed-loop driver circuits of the light source units described herein utilize switching converters to allow for efficient driving of a light source. Switching converters are generally highly efficient as compared to linear current drivers. When using switching converters, however, the duty cycle of the switching converter controls the voltage output of the switching converter, not the current output. This results in a non-linear relationship between the duty cycle and the current supplied to the light source, which makes it difficult to provide precise changes to the light source drive current. As the duty cycle is changed, the same increment in the duty cycle may result in significantly different and, in some instances, very large changes to the light source drive current. When a digital-to-analog converter is used to set the duty cycle, it may be difficult to configure a digital-to-analog converter to cover the full range of required duty cycles while still having sufficient resolution to avoid these very large shifts to the light source driver current.

Accordingly, the light source units described here are configured to generate a non-linear relationship between a feedback signal and the duty cycle of the switching converter as mentioned above. This feedback signal-to-duty cycle relationship increases the linearity of the relationship between the feedback signal and the light source drive current, which in turn simplifies control of the light source unit (and reduces unwanted variations in the drive current). In some examples, the light source unit includes an anti-logarithmic pulse width modulated ("anti-log PWM") circuit which generates a pulse-width modulated signal ("PWM signal") having a duty cycle that varies non-linearly as a function of an input signal to the anti-log PWM circuit. Specifically, the anti-log PWM circuit generates an input waveform and compares the input signal to the input waveform to determine the duty cycle of the PWM signal.

The input waveform is generated to have an anti-logarithmic shape, such that the duty cycle varies logarithmically as the input signal changes. The term "anti-logarithmic" may be understood to be exponential, approximately exponential, or an approximation of the shape of an exponential function. If used to drive a light source that operates like an ideal diode (e.g., a laser), the anti-log PWM circuit may provide a linear relationship between the input signal and the drive current provided by the switching converter. In some instances, the anti-log PWM circuit may modify a triangle shaped waveform of a signal to a signal with a waveform having the anti-logarithmic shape. By using the switching converter in conjunction with the anti-log PWM circuit, the switching converter may directly drive the laser of the light source unit using closed-loop control.

Accordingly, the switching converter may provide the benefits of closed-loop control (e.g., to control wavelength during short pulses and in other instances where a light source may not be at steady state) in a power-efficient manner. While improved power efficiency is generally desirable, it is especially beneficial in battery-powered devices where reducing power consumption is often a main priority. For example, the light source units described herein may be used in optical systems that are incorporated into various handheld or portable electronic devices such as laptops, smartphones, tablets, and wearable devices such as a watch, a band, a ring, or the like.

Figure 2B:
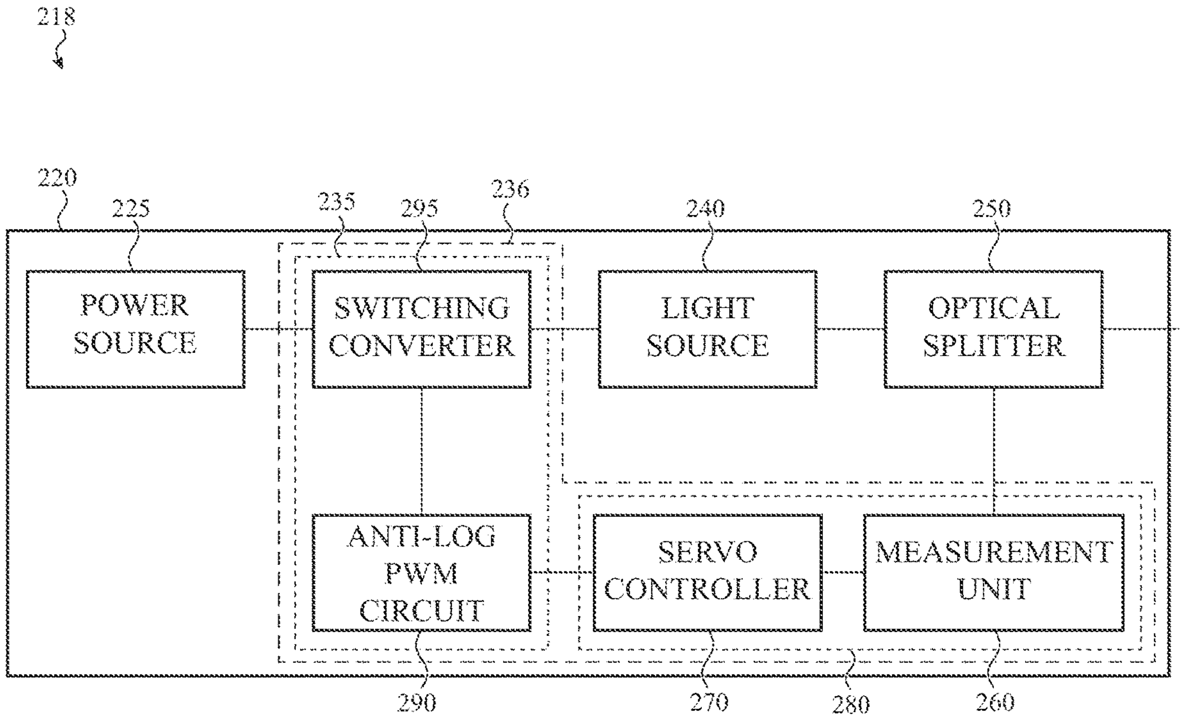
FIG. 2B illustrates an example block diagram of another light source unit with a switching converter as the driver.

FIG. 2B illustrates an example block diagram 218 of another light source unit with a switching converter as the driver. In FIG. 2B, the light source unit 220 includes a power source 225, a driver unit 236, a light source 240, an optical splitter 250, and a controller 280. In some embodiments, the driver unit 236 includes a driver circuit 235 and the controller 280. The controller may include a measurement unit 260 and a servo controller 270. The light source unit 220 utilizes closed-loop feedback to control at least one of a wavelength and/or an intensity of the light emitted by the light source. For example, the wavelength of light emitted by the light source 240 may vary with a drive current provided by the driver circuit 235, and the light source unit 220 may adjust the drive current to move the wavelength of light generated by the light source 240 toward a target wavelength. Because changing the drive current to a light source 240 may also impact its intensity, closed-loop control of wavelength may result in intensity variations of the generated light. In some instances, such as when the light source unit is used in an optical system to perform a measurement using the generated light, the intensity variations may be measured (e.g., by controller 280) and accounted for in the optical system.

To operate the light source 240, the power source 225 is connected to the driver circuit 235 to provide power thereto. As shown in FIG. 2B, the driver circuit 235 includes a switching converter 295, and the power source 225 is connected to the switching converter 295 to provide an input voltage thereto. When the switching converter 295 is a DC/DC converter, the power source 225 is a DC power supply (which can be powered by a battery, mains power, combinations thereof, and the like). The switching converter 295 generates an output voltage that powers the light source 240, thereby causing the light source 240 to generate light.

To provide closed-loop feedback, the controller 280 may generate a feedback signal that is used to control the driver circuit 235. Specifically, as the driver circuit 235 is powering the light source 240 to generate light, the controller 280 may receive a portion of the generated light via the optical splitter 250. The optical splitter 250 receives light from the light source 240, and separates the received light into two portions. A first portion of the received light is outputted from the light source unit 220, where it may be used by an optical system as desired. A second portion of the received light is to be passed to the controller 280, specifically to the measurement unit 260, which may generate one or more measurement signals indicative of intensity and/or wavelength of the second portion of light generated by the light source. The first and second portions of light may be split into any relative proportions as desired, such as 50/50, 10/90, 80/20, 35/65, 99/1, and so forth.

The measurement signal(s) are passed to the servo controller 270, which generates a feedback signal using the measurement signal(s). In some instances a measurement signal may be compared to a target value, and the feedback signal is derived from a difference between the measurement signal and the target value. For example, the measurement signal may be indicative of the wavelength that is currently being generated by the light source 240, and the feedback signal is based on a difference between the current wavelength and the target wavelength. The feedback signal may then be passed to the driver circuit 235, where the feedback signal is used to control the driver circuit.

The light source 240 may comprise any suitable light source, such as a laser or a light emitting diode. While shown in FIG. 2B as having a single light source 240, it should be appreciated that the light source unit 220 may include a plurality of light sources. For example, the light source unit may include a multiplexer and a plurality of light sources. In these instances, the multiplexer selectively connects an output of the switching converter 295 to a target light source of the plurality of light sources, thereby allowing the switching converter 295 to power the target light source. The light source 240 may be optically coupled to the optical splitter 250 in any suitable manner (e.g., via a waveguide or any other material and/or element through which light may propagate such as air, an upstream optical coupler, an upstream optical splitter, and so forth). In instances where the light source unit 220 includes multiple light sources, each light source may be optically coupled to the same optical splitter 250 or each light source may be connected to its own optical splitter (each of which may be connected to the controller 280).

As mentioned above, the controller 280 is shown in FIG. 2B as including a measurement unit 260 and a servo controller 270. In order to generate the measurement signal or signals discussed above, the measurement unit 260 may include one or more photodetectors that may output corresponding signals indicative of the intensity and/or wavelength of the light generated by the light source. Due to the numerous ways to generate signals indicative of intensity and/or wavelength, specific embodiments are not described herein. In some instances, the generated measurement signal (s) includes a wavelength measurement signal, an intensity measurement signal, combinations thereof, or the like. In some embodiments, the intensity of the light emitted by the light source 240 may be measured by the measurement unit 260, but is not used in generating the feedback signal. For example, the intensity measurement may be provided to another portion of an optical system, where it may be used by the optical system for other purposes (e.g., to account for variations in intensity during a measurement performed by the optical system).

The second portion of light may be converted into one or more electrical signals to form the measurement signal(s) so that the servo controller 270 may process the one or more measurement signals. Typically, light source units with closed-loop control may be feedback systems that compare a controlled variable to a target value. In FIG. 2B, the servo controller 270 may compare the received one or more measurement signals to corresponding target values. Put differently, the servo controller 270 may compare an emitted wavelength of light with a target wavelength of light. The servo controller 270 may generate a feedback signal based on the difference between the wavelength measurement signal and a target wavelength value. Put another way, the servo controller 270 may receive an input signal such as the one or more measurement signals, and compare these to a target value (e.g., target wavelength value) and create an output signal, which may be the feedback signal. The feedback signal may be used to correct the wavelength should the light source 240 deviate from the target wavelength value. That is, the current that drives the light source 240 may be based at least in part on the feedback signal.

The feedback signal may be passed from the servo controller 270 to the driver circuit 235. The driver circuit 235 includes an anti-logarithmic pulse width modulated circuit 290 ("anti-log PWM circuit"), which controls operation of the switching converter 295. The anti-log PWM circuit 290 receives the feedback signal as an input signal from the servo controller 270 and generates a voltage with a duty cycle that varies logarithmically with the input signal. The voltage from the anti-log PWM circuit 290 is then transmitted to the switching converter 295 to control the switching behavior of the switching converter 295 (and thus, the output voltage of the switching converter 295). Light source 240 may have a non-linear relationship between input voltage and drive current, and thus the logarithmic relationship between the feedback signal and the duty cycle of the switching converter 295 may be selected to provide a linear relationship between the feedback signal (i.e., a voltage derived therefrom) and a drive current of the laser to the light source 240. The elements and functionality of the driver circuit 235 will be described in further detail with reference to FIGS. 3A-5.

Accordingly, the switching converter 295 (which may be any DC/DC switching converter, for example, a buck converter, a boost converter, a buck-boost converter, a Ćuk converter, a Zeta converter, a SEPIC converter, and so forth) provides a power efficient option for providing closed-loop control of the light source 240. The anti-log PWM circuit 290 allows for fine control across the range of desired drive currents, thereby reducing unwanted fluctuations in drive current. Accordingly, the light source unit 220 may allow for power efficient, closed-loop control of a light source 240 across a range of situations (e.g., to produce short pulses and/or adjust for temperature variations).

Figure 3A:
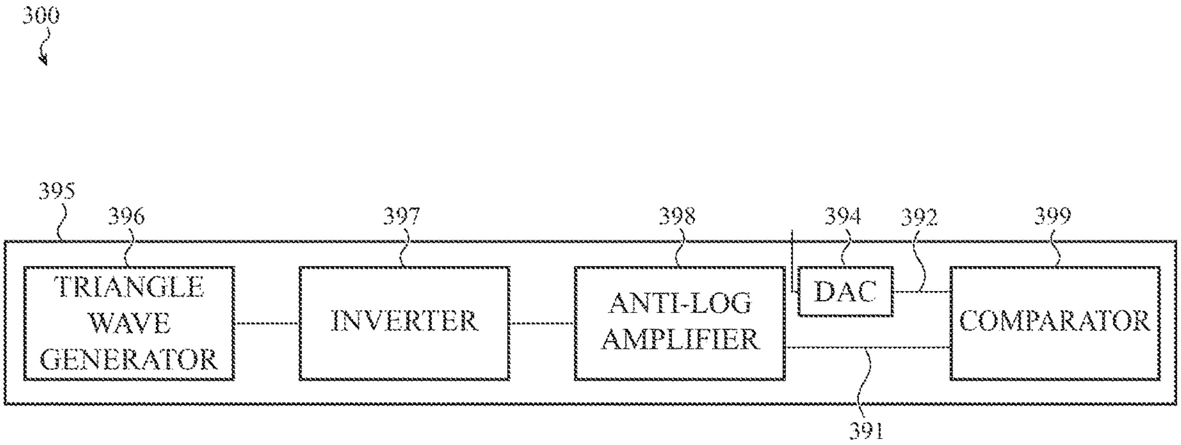
FIG. 3A illustrates an example block diagram of an anti-logarithmic pulse width modulated circuit.
Figure 3B:
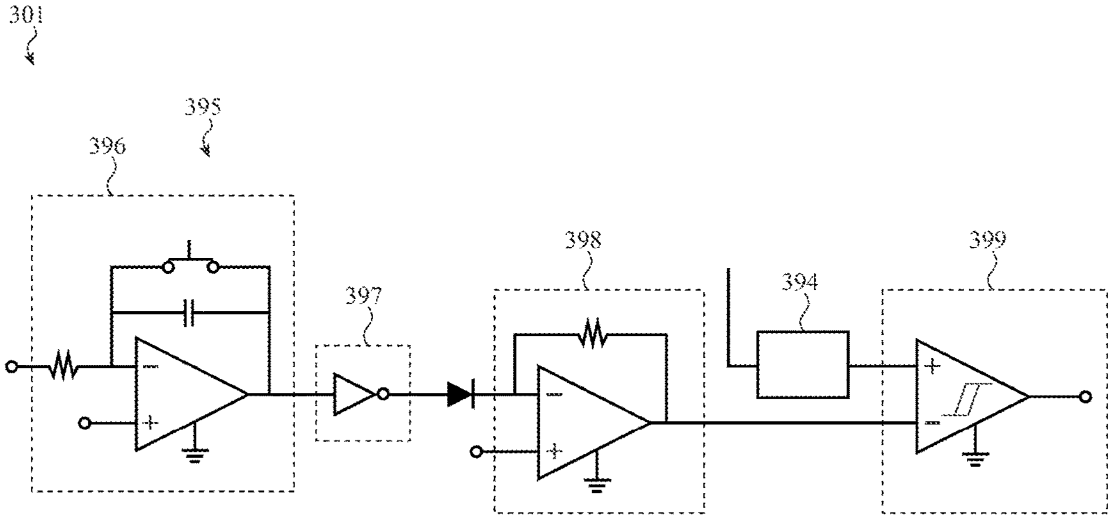
FIG. 3B illustrates an example schematic of an anti-logarithmic pulse width modulated circuit.

FIG. 3A illustrates an example block diagram 300 of an anti-logarithmic pulse width modulated circuit 395 suitable for use with the control systems and light source units described herein. The anti-log PWM circuit 395 may include a triangle wave generator 396, an inverter 397, an anti-log amplifier 398, a digital-to-analog converter 394, and a comparator 399. FIG. 3B shows an example circuitry for each of the components of the anti-log PWM circuit 395, though it should be appreciated that each component may be replaced with other equivalent circuitry. Although the components of the block diagram 300 are arranged in a particular order, the same number of components or fewer or more components may be used to achieve the same or similar result and/or the components may be arranged as necessary to achieve the desired result. One arrangement of these elements will be described in further detail with reference to FIGS. 3A and 3B.

The triangle wave generator 396 generates a standard triangle wave signal for outputting to the inverter 397. The output of the triangle wave generator 396 is provided to the input of the inverter 397. The inverter 397 shifts the positive values to negative values and vice versa, thus inverting the triangle wave signal output by the triangle wave generator 396. The inverted triangle wave signal generated by the inverter 397 is transmitted to the anti-log amplifier 398.

In some embodiments, the anti-log amplifier 398 has two inputs, one of which is connected to the output of the inverter 397. The anti-log amplifier 398 may receive the inverted signal from the inverter 397. The inverted signal may be modified by the anti-log amplifier 398 from a triangle shaped waveform into a waveform having an anti-logarithmic shape. The waveforms and the use of the anti-log PWM circuit 395 in the light source unit will be described in further detail with reference to FIGS. 4 and 5. The voltage output signal with a waveform having an anti-logarithmic shape from the anti-log amplifier 398 may be transmitted to the comparator 399.

The comparator 399 has two inputs. A first input 391 of the comparator 399 receives the output signal from the anti-log amplifier 398 (i.e., the waveform having the anti-logarithmic shape) and the second input 392 receives the output from the digital-to-analog converter ("DAC") 394. In some embodiments, the first input of the comparator 399 is a non-inverting input and the second input is an inverting input. The comparator 399 may then output a voltage with one of two values depending on whether the signal on the DAC voltage is greater than the output of the anti-log amplifier 398. This voltage controls a switching converter, as will be described in further detail with reference to FIGS. 4 and 5.

FIG. 3B illustrates an example schematic 301 of an anti-logarithmic pulse width modulated circuit 395. The anti-log PWM circuit 395 includes the same components as FIG. 3A, and it may be understood that similar components perform similar functions. The anti-log PWM circuit 395 includes a triangle wave generator 396, an inverter 397, an anti-log amplifier 398, a DAC 394, and a comparator 399.

As previously described with reference to FIG. 3A, in FIG. 3B, the anti-logarithmic pulse width modulated ("anti-log PWM") circuit generates a pulse-width modulated signal ("PWM signal") having a duty cycle that varies as a function of the input signal (e.g., feedback signal). Specifically, the anti-log PWM circuit compares the input signal to an input waveform to determine the duty cycle of the PWM signal. This input waveform is generated to have an anti-logarithmic shape, such that the duty cycle varies logarithmically as the input signal changes. If used to drive a light source that operates like an ideal diode, the anti-log PWM circuit may provide a linear relationship between the input signal and the drive current provided by the switching converter. The anti-log PWM circuit may modify a triangle shaped waveform of a signal to a signal with a waveform having an anti-logarithmic shape. It may be understood that the anti-log PWM circuit is generally a non-linear PWM circuit that may generate signals with different waveform shapes, where the anti-log input signal with a duty cycle that varies logarithmically as the input signal changes is the preferred embodiment.

Figure 4:
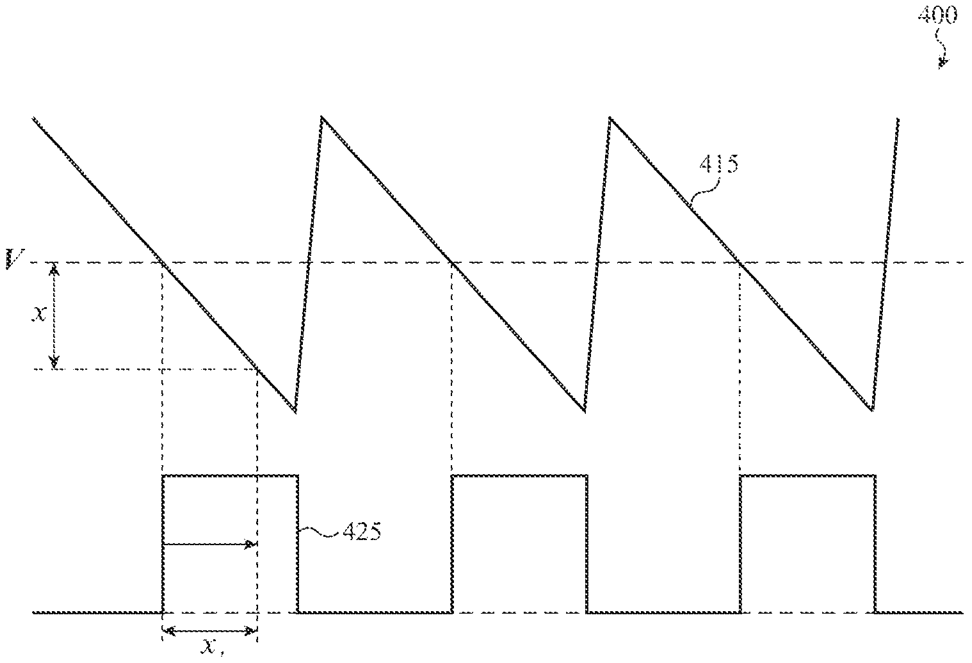
FIG. 4 illustrates an example triangular waveform that may be used to set the duty cycle of a driver and a corresponding pulse width modulated signal.

FIG. 4 illustrates an example 400 of a triangular waveform 415 that may be supplied to a comparator (e.g., to a first input 391 of the comparator 399 as shown in FIGS. 3A and 3B) to generate a PWM signal 425. As previously described with reference to FIG. 2, a switching converter may receive a pulse width modulated signal, the duty cycle of which controls a voltage output of the switching converter. If the triangular waveform 415 of FIG. 4 is supplied to the comparator, the duty cycle of the PWM signal 425 will vary linearly as a function of an input to the other input of the comparator (e.g., the output of the DAC 394 of FIGS. 3A-3B, which is represented by "V" in FIG. 4). Indeed, an incremental change "x" in V will result in the same change in duty cycle "$x_1$" regardless of the starting value of V. As discussed above, this linear response will result in a non-linear response between changes in the duty cycle and the drive current generated by the switching converter.

Figure 5:
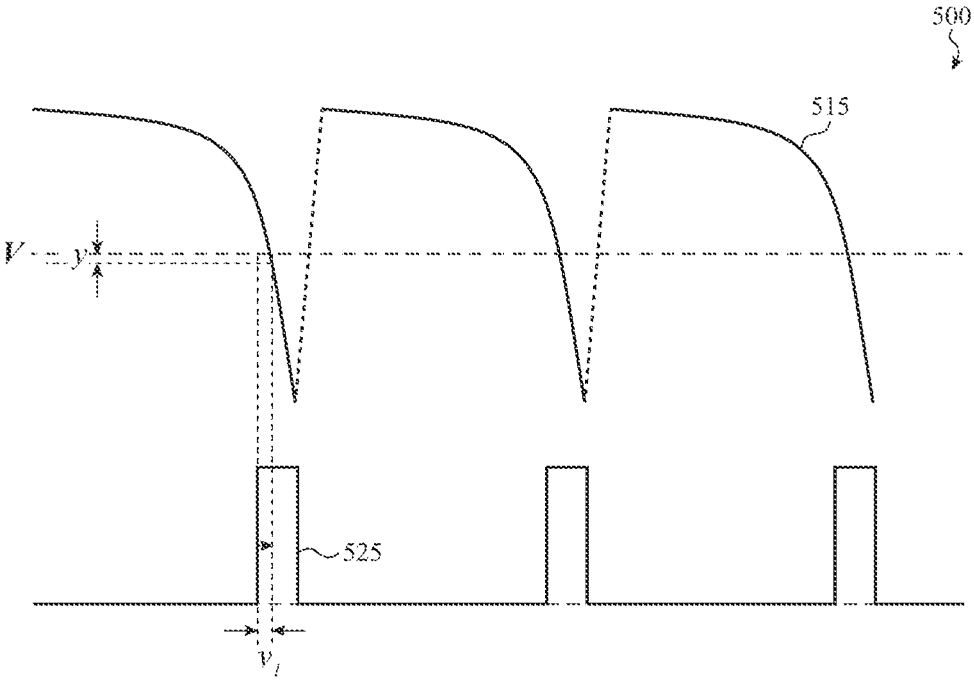
FIG. 5 illustrates an example waveform generated by the anti-logarithmic pulse width modulated circuit of FIGS. 3A and 3B, and also illustrates a pulse width modulated signal.

Conversely, FIG. 5 illustrates an example 500 of a waveform 515 generated by the anti-log amplifier 398 of FIGS. 3A and 3B. The waveform 515, when supplied to the first input 391 of comparator 399, generates a PWM signal 525. The PWM signal 525 may control a switching converter as discussed in relation to FIG. 2. Because the waveform 515 has an anti-logarithmic shape, the duty cycle varies logarithmically as a function of an input to the other input of the comparator 399 (e.g., the output of the DAC 394 of FIGS. 3A-3B, which is represented by "V" in FIG. 5). In these instances, an incremental change "y" in V will result in a change in the duty cycle "y1" with a magnitude that is dependent on the initial value of V. This non-linear relationship between input V and the duty cycle of the PWM signal 525 may be used to increase the linearity of the relationship between the input V and the drive current. The example waveform 515 and the duty cycle graph 525 are mere representations of possible waveforms that generally represent signals produced by the switching converter and the amounts that the waveform 515 and the duty cycle graph 525 may shift are not drawn to scale.

It should be appreciated that the light source units and associated driver circuits described herein may be used in any suitable device for a variety of purposes. For example, a light source unit may be used for sensing and processing light in electronic systems and devices. Some light source units may be included in an electronic device, such as mobile devices, tablets, smartphones, and so forth, which may be used for various purposes such as optical communication, environmental sensing, and/or biometric sensing. Mobile electronic devices are growing in popularity and these devices are often small enough to be portable and/or handheld. The architectures of these mobile devices may include various components, including photonics circuitry, which may affect the size of the device into which it is incorporated.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A light source unit, comprising:
a light source configured to emit a first light;
an optical splitter configured to split the emitted first light into a first portion of light and a second portion of light;
a controller configured to:
receive the second portion of light; and
generate a feedback signal using the received second portion of light; and
a driver circuit, comprising a switching converter, the driver circuit configured to:
receive the feedback signal;
generate a first voltage with a duty cycle that varies logarithmically with a voltage change of the feedback signal; and
supply a current based on the first voltage to the light source, wherein:
the driver circuit comprises:
an anti-logarithmic pulse width modulated circuit configured to:
generate a waveform having an anti-logarithmic shape; and
compare the waveform having the anti-logarithmic shape to the feedback signal to generate the first voltage; and
the switching converter receives the first voltage to control a voltage output of the switching converter.

2. The light source unit of claim 1, wherein the controller comprises a measurement unit operable to:
receive the second portion of light; and generate a wavelength measurement signal indicative of a wavelength of light of the second portion of light.

3. The light source unit of claim 2, wherein the measurement unit is configured to be operable to output an intensity measurement signal indicative of an intensity of the second portion of light.

4. The light source unit of claim 2, wherein the controller further comprises a servo controller operable to:

receive the wavelength measurement signal from the measurement unit; and generate the feedback signal.

5. A light source unit, comprising:

a light source configured to emit a first light;

an optical splitter configured to split the emitted first light into a first portion of light and a second portion of light;

a controller configured to:

receive the second portion of light; and generate a feedback signal using the received second portion of light; and a driver circuit, comprising a switching converter, the driver circuit configured to:

receive the feedback signal;

generate a first voltage with a duty cycle that varies logarithmically with a voltage change of the feedback signal; and supply a current based on the first voltage to the light source, wherein;

the controller comprises:

a measurement unit operable to:

receive the second portion of light; and generate a wavelength measurement signal indicative of a wavelength of light of the second portion of light; and a servo controller operable to:

receive the wavelength measurement signal from the measurement unit; and generate the feedback signal;

the driver circuit comprises an anti-logarithmic pulse width modulated circuit operable to receive the feedback signal from the servo controller; and the anti-logarithmic pulse width modulated circuit comprises:

a triangle wave generator operable to output a triangle waveform signal;

an inverter operable to receive the triangle waveform signal and invert the triangle waveform signal;

an anti-logarithmic amplifier operable to receive the inverted triangle waveform signal and generate a waveform having an anti-logarithmic shape;

a digital-to-analog converter operable to:

receive the feedback signal; and convert the feedback signal to an analog feedback signal; and a comparator operable to receive the waveform as a first input and the analog feedback signal as a second input.

6. The light source unit of claim 5, wherein the measurement unit is configured to generate an intensity measurement signal indicative of an intensity of the second portion of light.

7. The light source unit of claim 5, wherein the voltage change of the feedback signal is a voltage change of the analog feedback signal.

8. The light source unit of claim 1, wherein the switching converter comprises one of a buck converter, a boost converter, a buck-boost converter, a zeta converter, a Ćuk converter, or a SEPIC converter.

9. A driver circuit, comprising:

an anti-logarithmic pulse width modulated circuit comprising a digital-to-analog converter, the anti-logarithmic pulse width modulated circuit configured to generate a pulse width modulated voltage having a duty cycle that varies logarithmically with a voltage change of an input signal; and a switching converter configured to:

receive the pulse width modulated voltage; and supply a current to a laser based on the pulse width modulated voltage, the laser configured to receive a drive current from the switching converter; wherein:

the anti-logarithmic pulse width modulated circuit is configured to generate a linear relationship between the input signal and the drive current.

10. The driver circuit of claim 9, wherein:

the anti-logarithmic pulse width modulated circuit comprises:

a triangle wave generator operable to output a triangle waveform signal;

an inverter operable to receive the triangle waveform signal and invert the triangle waveform signal;

an anti-logarithmic amplifier operable to receive the inverted triangle waveform signal and generate a waveform having an anti-logarithmic shape; and a comparator operable to receive the waveform as a first input and the input signal as a second input.

11. The driver circuit of claim 9, wherein the switching converter comprises one of a buck converter, a boost converter, a buck-boost converter, a zeta converter, a Ćuk converter, or a SEPIC converter.

12. The driver circuit of claim 9, wherein the input signal is an output of the digital-to-analog converter.

13. A method of driving a light source, comprising:

receiving, at a controller, a measured operating parameter of the light source;

generating a feedback signal using the measured operating parameter;

transmitting the feedback signal to a driver circuit;

generating a first voltage with a duty cycle that varies logarithmically with the feedback signal, wherein generating the first voltage comprises:

generating a waveform having an anti-logarithmic shape using an anti-logarithmic pulse width modulated circuit; and comparing the waveform to the feedback signal; and supplying a current based on the first voltage, via a switching converter, to the light source.

14. The method of claim 13, further comprising converting the feedback signal to an analog feedback signal using a digital-to-analog converter.

15. The method of claim 14, wherein comparing the waveform to the feedback signal comprises comparing the waveform to the analog feedback signal.

16. The method of claim 13, wherein generating the waveform comprises:

receiving a triangle waveform signal from a triangle wave generator; and generating the waveform from the triangle waveform signal using an anti-logarithmic amplifier.

* * * * *